United States Patent [19]

Vanderleest

[11] 4,418,879

[45] Dec. 6, 1983

[54] SCOOP AND INLET FOR AUXILIARY POWER UNITS AND METHOD

[75] Inventor: Siebold Vanderleest, Seattle, Wash.

[73] Assignee: The Boeing Company, Seattle, Wash.

[21] Appl. No.: 220,515

[22] Filed: Dec. 29, 1980

[51] Int. Cl.³ .............................................. B64D 33/02
[52] U.S. Cl. .................................. 244/53 B; 137/15.1
[58] Field of Search ...................... 244/53 R, 53 B, 58, 244/57, 73 R, 15, 3.1, 14, 130, 12.3, 23 B; 102/374, 375, 381; 137/15.1, 15.2; 138/37-42; 60/269, 244, 221-222, 270, 39.14 M, 39.14 R; 440/38-47; 98/1, 1.5, 61, 62, 64, 13; 415/DIG. 7, 219 R, 182, 198.1

[56] References Cited

U.S. PATENT DOCUMENTS

| | | | |
|---|---|---|---|
| 2,396,598 | 3/1946 | Neumann et al. | 123/171 |
| 2,477,637 | 8/1949 | Mercier | 244/53 B UX |
| 2,573,834 | 11/1951 | Davidson | 244/53 |
| 2,650,752 | 9/1953 | Hoadley | 230/120 |
| 2,694,357 | 11/1954 | Lee | 98/1 |
| 2,812,980 | 11/1957 | Kadosch et al. | 60/230 |
| 3,001,740 | 9/1961 | Montgomery | 244/53 B |
| 3,027,711 | 4/1962 | Rae | 60/35.6 |
| 3,099,423 | 7/1963 | Wilde et al. | 244/12.3 |
| 3,109,610 | 11/1963 | Quenzler et al. | 244/15 |
| 3,129,910 | 4/1964 | Smith | 244/53 B |
| 3,314,437 | 4/1967 | Pike | 137/15.1 |
| 3,347,496 | 10/1967 | Opfer, Jr. | 244/53 B |
| 3,489,377 | 1/1970 | Pearson et al. | 244/58 |
| 3,599,429 | 8/1971 | Bigelis | 60/39.09 |
| 3,613,704 | 10/1971 | Goldsmith | 137/15.2 |
| 3,659,424 | 5/1972 | Polk, Jr. | 60/269 |
| 3,717,163 | 2/1973 | Herr | 137/15.1 |
| 3,900,177 | 8/1975 | Calder et al. | 244/53 |
| 3,915,413 | 10/1975 | Sargisson | 244/53 |
| 4,121,606 | 10/1978 | Holland et al. | 137/15.1 |
| 4,174,083 | 11/1979 | Mohn | 244/53 B |
| 4,203,566 | 5/1980 | Lord | 244/53 B |

FOREIGN PATENT DOCUMENTS

1143393 2/1963 Fed. Rep. of Germany .
1183378 12/1964 Fed. Rep. of Germany .

*Primary Examiner*—Galen L. Barefoot
*Attorney, Agent, or Firm*—Delbert J. Barnard; Eugene O. Heberer; Joan H. Pauly

[57] ABSTRACT

An air inlet and scoop for aircraft auxiliary power units to provide satisfactory performance thereof under all operational conditions, including full capability for in-flight starting at high altitudes, whereby operational difficulties caused by thick boundary layers and adverse pressure gradients between the inlet and the tail cone in the vicinity of the inlet are overcome. The inlet opening is contoured along its outer edges to conform to the aircraft fuselage and has a ramp trailing inwardly into the opening, starting at the fuselage and forming the bottom surface of the inlet. The inlet has generally parallel side walls trailing inwardly, the inlet side walls extending inwardly from the fuselage edges along the inlet opening. A scoop is hinged adjacent the fuselage at one end of the inlet opening, the aircraft having means therein to operate the scoop so as to open and close the inlet opening. The scoop has a closing wall surface with respect to the inlet opening, which when in the closed position is contoured to conform with the fuselage, the closing wall surface being continuous in the open and closed positions and generally limited to the extent of the inlet opening.

The method of overcoming the problems of thickness of boundary layer and adverse pressure gradient between the inlet and tail cone in the vicinity of the inlet.

15 Claims, 9 Drawing Figures

4,418,879

SCOOP AND INLET FOR AUXILIARY POWER UNITS AND METHOD

BACKGROUND OF THE INVENTION

Aircraft auxiliary power units have been, for example, gas turbines located in the aft fuselage. The turbines provide electrical power and compressed air on the ground, as well as in flight. They drive the air conditioning packs of the environmental control system, air driven hydraulic pumps and the starters for the wing engines. They also provide power for wing engine starts during flight, up to 14,000 feet. The auxiliary power unit generators provide electrical power to the airplane system when the main engine generators are not operating.

Typically, the air supply to the gas turbines enters through a 20° ramp inlet positioned in the tail cone. In the prior art, the inlets were generally of the flush type and did not provide sufficient pressure recovery to consistently start and/or operate the auxiliary power units in flight, such starting being required up to altitudes as high as 25,000 feet. The inability to start was due to thick boundary layers on the aft body; the boundary layers vary in thickness from five to twenty inches, for example.

Ogee wing defectors have been used to overcome the prior art problems, but they cause an excessive amount of drag.

SUMMARY OF THE INVENTION

It was found that various types of scoops having side plates dissipated the boundary layer and substantially eliminated the adverse pressure gradient in the vicinity of the inlet between the inlet and the tail cone. It was also found that scoops without side plates did not recover sufficient inlet air to meet the requirements.

One type of successful scoop, according to the invention, is a rectangular box hinged at the forward end of an inlet. The box is open to have a passage therethrough and when the inlet is closed the box extends outwardly of the fuselage, the inner wall of the box forming the inlet closure.

Other types of scoops, according to the invention, are hinged to the aircraft adjacent the aft end of the inlet opening. They have a closing wall contoured to the fuselage and have channel forming side plates contoured to the side walls of the inlet against which they fit on closing.

It was found that when the side plates of the scoop were relatively shallow toward the leading edge of the scoop, the scoop improved the inlet air recovery because the open scoop provided side spacing between the edges of the forward portions of the plates and the fuselage.

Another type of scoop, according to the invention, has longer or deeper side plates at the leading edge so that the side plates extend into slots in the aircraft to rigidly support the scoop in its open position.

Accordingly, it is an object of the invention to provide an improved scoop and inlet combination and method for in-flight auxiliary power units in which the scoop is adapted to open and admit sufficient air to start operation at any altitude up to 25,000 feet and operate satisfactorily up to 42,000 feet.

It is another object of the invention to provide improved scoops that dissipate relatively thick boundary layers and eliminate adverse pressure gradients between the inlet and the tail cone of an aircraft in the vicinity of the inlet.

It is a further object of the invention to provide scoops for auxiliary power unit inlets, as described in the preceding paragraphs, that increase the air pressure recovery into the inlet in the order of 3 to 5 times that of the prior art inlets.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings which are for illustrative purposes.

DESCRIPTION OF THE PREFERRED EMBODIMENTS

Figure 1:
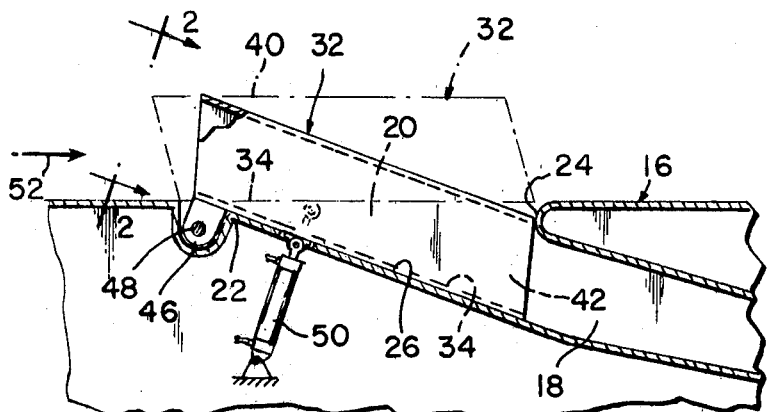
FIG 1 is a partially cross-sectional view of a rectangular scoop, according to the invention, which fits into the inlet in the open position and which extends along the fuselage in the closed position.
Figure 2:
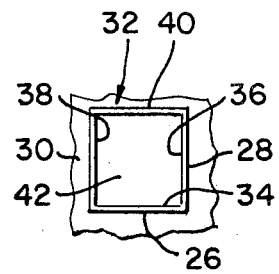
FIG. 2 is an end view of the scoop taken along the line 2—2 in FIG. 1.
Figure 8:
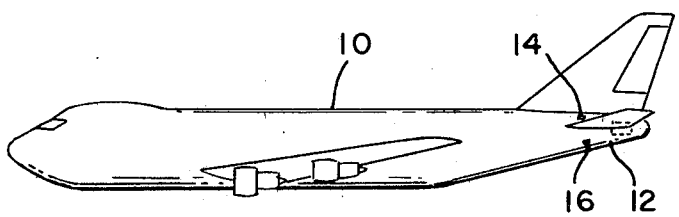
FIG. 8 is an elevational view of a large aircraft in which scoops and inlets for auxiliary power units are illustrated as being in the vicinity of the tail cone.

Referring again to the drawings, there is shown in FIG. 8 a large aircraft 10 in which auxiliary power units are typically installed in a tail cone 12 having their air inlets in positions such as 14 or 16, for example. In FIG. 1 a portion of a tail cone 16 is shown having an air inlet 18 and an inlet opening 20 in the fuselage, extending from a forward end at 22 to a rearward elliptical end 24. The inlet has an approximately 20° ramp along the surface 26 and has typical flat side walls, as at 28 and 30, FIG. 2, with which a rectangular scoop, generally designated as 32, is complementary. That is, the rectangular scoop 32, shown in its open position in full lines in FIG. 1, extends into the inlet to form a ramp surface at 34 along its inner wall and to form inner side walls 36 and 38 above the ramp. An outer wall 40 completes the rectangle, to form a rectangular passage 42 for the air into the inlet 18 for an auxiliary power unit in the tail cone.

The inlet scoop 32 is rotated on a forward hinge 46, pivoted at 48, from a closed position, shown in phantom outline, externally of the fuselage surface with which the wall 34 is contoured. The wall 34 closes the inlet opening 20 and when so closed, the scoop provides an air passage from the leading edge thereof to the trailing edge along the fuselage surface. The scoop is open and closed by means of an actuator 50.

The scoop may normally be open when the aircraft is on the ground and may be closed on take-off and opened at any altitude up to 25,000 feet. It has been found successful to provide inlet pressure recoveries to properly operate the auxiliary power units in the aircraft. Scoops, as 32, have been made to be 5 inches or 2½ inches high along the walls 36 and 38 and 14½ to 17½ inches long. In the normal cruise position the inlet door formed by the wall 34 is closed, and the scoop is parallel to the flow as indicated by the arrow 52. When the auxiliary power unit is to be started at any altitude, the scoop 32 is rotated on its pivot by the actuator 50 to move the door wall 34 onto the ramp 26 inside the inlet 18, the side walls of the scoop being juxtaposed to the side walls of the inlet.

Figure 9:
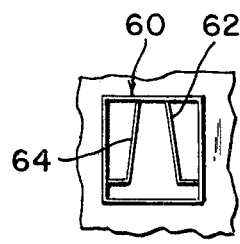
FIG. 9 is a schematic end view of a rectangular box-type inlet, as shown in FIG. 1, having internal stiffeners.

In FIG. 9, a schematic view is shown of a scoop 60 of the same type as the scoop 32 but with stiffeners 62 and 64 inserted for additional strength. It was found that the stiffeners 62 and 64 did not significantly reduce the air flow through the scoop.

Figure 3:
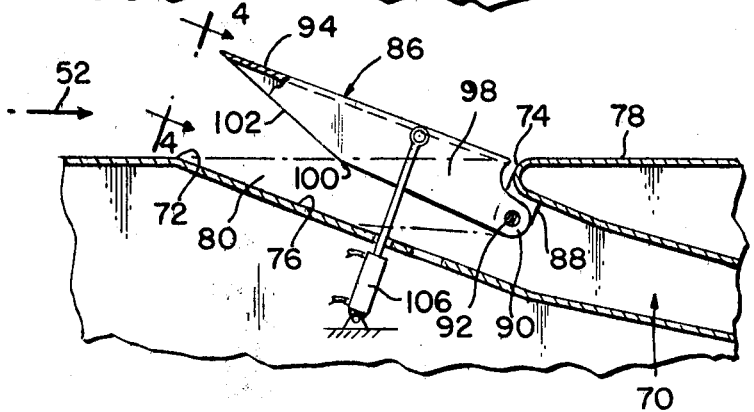
FIG. 3 is an partially cross-sectional view of a scoop hinged at its after end to the fuselage in the inlet and having side plates of varying depths.
Figure 4:
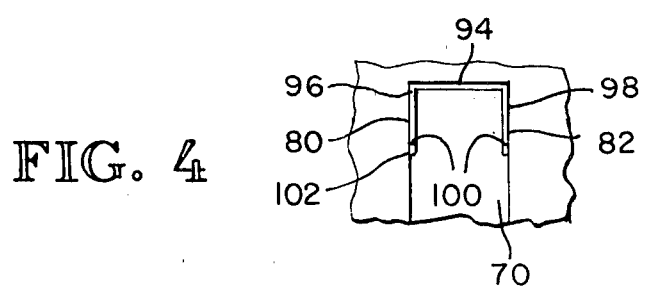
FIG. 4 is an end view of the scoop taken along the lines 4—4 in FIG. 3.

In FIGS. 3 and 4, there is an auxiliary power unit air inlet, generally designated as 70, having a fuselage opening extending from a leading edge at 72 to a trailing edge at 74, the latter formed having elliptical cross-sectional surface. A ramp 76 has an inclination of about 20° with the fuselage surface 78. The inlet 70 has generally parallel side walls substantially perpendicular to a horizontal plane through the inlet opening. Outer edges of the walls 80 and 82 are flush with the fuselage and have the same contour. A scoop, generally designated as 86, is hinged to flanges 88 extending laterally outwardly of the inlet, ears 90 on the trailing end of the scoop being hinged by pivot 92. The scoop has an outer closing wall 94 which in the closed position is in contour with the fuselage. Extending inwardly from the wall 94 and generally at right angles thereto are channel forming side plates or walls 96 and 98, which are juxtaposed to the walls 80 and 82 of the inlet.

The walls 96 and 98 have a trailing portion terminating forwardly at a break 100, so that when the scoop is in the closed position the break edge closes substantially against the ramp surface 76. Forwardly of the break 100, the side plates have a forwardly tapering inner edge 102 which is adapted to fit along the ramp surface 76 when the door 94 is in the closed position.

The scoop 86 is adapted to be opened and closed by a pair of actuators 106, only one being shown. The actuators are laterally outwardly of the inlet so as to not interfere with the flow. Flexible seals are provided along the gaps, as forwardly of the elliptical end at 74, and along the side wall surfaces to seal the door when it is closed, and to also provide a seal between the rear portion of the door around the hinges. The gap between the fuselage surface 78 and the edges at 102 of the scoop provide additional space to receive inlet air into the inlet.

The scoop or hinged door 86, for one installation, is about 17.5 inches long and 7 inches wide, and in the closed position completely seals off the inlet opening. The leading edge of the scoop in the open position is about 10.6 inches above the fuselage so as to provide sufficient inlet air pressure recovery.

Figure 7:
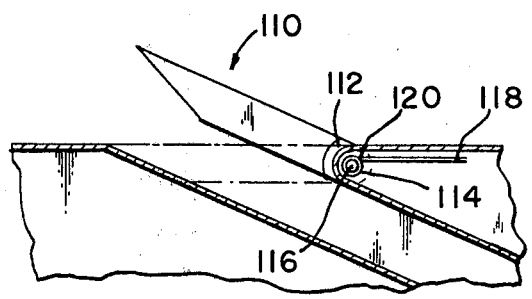
FIG. 7 is a partially cross-sectional view of another embodiment of a scoop and inlet construction.

The inlet and scoop in FIG. 7 are similar to that shown in FIG. 3, except here a scoop 110 has hinge members 112 extending from both side plates into the aircraft directly in alignment with the side plates of the scoop. The parallel hinge plates 112 are secured to the aircraft with a relatively large pin 114 to pivot at 116, the pivoting occurring by means of a linearly moving rod 118, pivotally engaged with the pin 116 at 120. Thus, as the rod 118 is moved linearly by an actuator, the pivot at 120 causes the pin 114 to be rotated to open and close the scoop 110.

Here again, the scoop in the open position permits air to enter the inlet from the sides of the parallel walls of the scoop.

Figure 5:
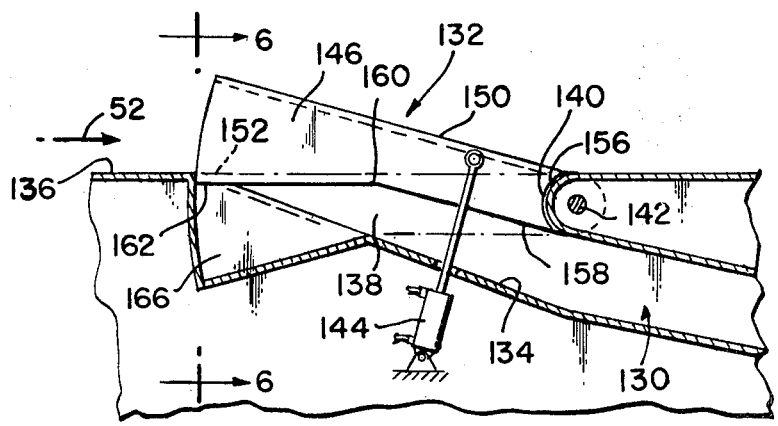
FIG. 5 is a partially cross-sectional view of a scoop and inlet in which the side plates extend into slots juxtaposed to the inlet when the inlet is closed and to a lesser amount when the inlet is open.
Figure 6:
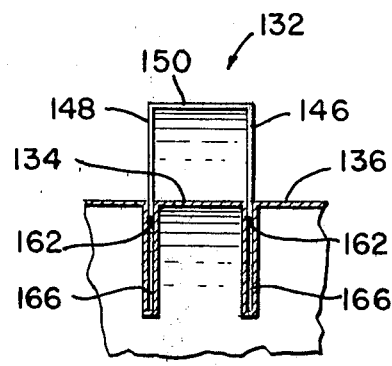
FIG. 6 is a partially cross-sectional end view taken substantially along the line 6—6 in FIG. 5.

In FIGS. 5 and 6 another embodiment of an inlet, generally designated as 130, and a scoop, generally designated as 132, are illustrated. Here, the inlet has a ramp 134 generally at 20° to the fuselage surface 136, the inlet having generally parallel side walls, as 138, trailing inwardly into the aircraft and extending outwardly to the fuselage edge with which they are in contour.

The scoop 132 has hinge members 140 trailing into the aircraft outwardly of the inlet, mounted on a pin 142, secured in the aircraft and on which the scoop pivots when actuated by a pair of actuators 144, both being laterally outside of the scoop side walls 146 and 148, to be out of the flow path through the inlet. The scoop has an outer or closing wall 150 which in the closing position is flush with the fuselage surface and sealingly engaged with the inlet opening extending from the ramp at 152 to the convex surface 156 of the inlet.

The channel forming plates 146 and 148 have a rearward portion having inner edges 158 which terminate forwardly at a break 160, and extending forwardly of the break are downwardly inclined edges 162, terminating at the leading edge of the scoop. The side plate portions outwardly of the edges 158 fit the contour of the side walls, as 138, of the inlet opening and the side plates forwardly of the break 160 fit into slots 166 in the aircraft laterally of the inlet opening.

When the scoop is closed, the side plates rearwardly of the break 160 are in contour with the side walls of the inlet and the side plates forwardly of the break 160 fit into the slots to form a sealed relationship between the scoop and the opening. Similarly, there is a seal along the trailing edges of the scoop in the hinge areas.

The effect of the leading edges of the scoop, extending into the slots when in the open position, is to provide support and stability for the scoop. Air passage through the scoop in the open position is between the side plates 146 and 148, the outer wall 150 and the ramp 134.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specifics forms shown or uses mentioned except as defined in the accompanying claims.

What is claimed is:

1. For use on an aircraft, an air inlet and scoop for an in-flight auxiliary power unit, the scoop being adapted to open and start operation at altitude and on the ground, comprising:

an inlet opening contoured along its outer edges to conform to the aircraft fuselage, a ramp trailing inwardly into the opening starting from the fuselage and forming the bottom surface of the inlet;

the inlet opening having generally parallel side walls trailing inwardly along opposite edges of the ramp;

the side walls extending inwardly from the fuselage edges along the inlet opening;

a scoop hingedly engaged to said aircraft adjacent said fuselage and adjacent one end of said inlet opening; and means in said aircraft to operate said scoop from positions in which said scoop opens and closes said inlet opening;

said scoop having a closing wall with respect to said inlet opening, said closing wall closing said opening in the closed position and being contoured to conform with the fuselage surface in the closed position;

said closing wall being continuous in the open and closed positions and generally limited to the extent of said inlet opening;

said scoop being externally of said aircraft in the closed position;

said scoop having a cross section complementary to said inlet to fit therein in the open position;

said scoop having a passage therethrough to permit inlet air to move therethrough from outside the fuselage into the inlet.

2. A method of dissipating boundary layer and eliminating adverse pressure gradient adjacent an auxiliary power unit air inlet in an aircraft tail cone, comprising:

an inlet opening contoured along its outer edges to conform to the aircraft fuselage, a fixed ramp trailing inwardly into the opening starting from the fuselage and forming the bottom surface of the inlet;

the inlet having generally parallel side walls trailing inwardly and rearwardly along opposite edges of the ramp;

the side walls extending inwardly from the fuselage edges along the inlet opening;

hingedly engaging a scoop at a trailing end to said aircraft adjacent said fuselage and adjacent the rearward end of said inlet opening; a leading end of the scoop being free;

providing in the aircraft means to operate the scoop from positions in which said scoop opens and closes said inlet opening; and providing said scoop with a closing wall with respect to said inlet opening, said closing wall closing said opening in the closed position and being contoured to conform with the fuselage surface in the closed position;

said closing wall being continuous in the open and closed positions and generally limited to the extent of said inlet opening;

pivoting said closing wall outwardly on its hinge to be spaced from said ramp to open said inlet opening;

continuous scoop side walls extending inwardly from edges of said closing wall to form an inwardly opening channel in cross section;

said scoop side walls being juxtaposed to respective inlet side walls in the closed position within the inlet opening;

said scoop side walls in the closed position terminating inwardly adjacent said hinge and having rearward inner edges spaced outwardly from said ramp, said inner edges extending forwardly to be closely adjacent said ramp and tapering along said ramp to a point at the forward end of said scoop and at the closing wall;

said tapering inner edges of scoop side walls being substantially spaced outwardly from said fuselage surface when said scoop is open.

3. The method according to claim 2 including:

spacing portions of said rearward inner edges outwardly from said fuselage surface when said scoop is open.

4. For use on an aircraft, an air inlet and scoop for an in-flight auxiliary power unit, the scoop being adapted to open and start operation at altitude and on the ground, comprising:

an inlet opening contoured along its outer edges to conform to the aircraft fuselage, a ramp trailing inwardly into the opening starting from the fuselage and forming the bottom surface of the inlet;

the inlet opening having generally parallel side walls trailing inwardly along opposite edges of the ramp;

the side walls extending inwardly from the fuselage edges along the inlet opening;

a scoop hingedly engaged to said aircraft adjacent said fuselage and adjacent one end of said inlet opening; and means in said aircraft to operate said scoop from positions in which said scoop opens and closes said inlet opening;

said scoop having a closing wall with respect to said inlet opening, said closing wall closing said opening in the closed position and being contoured to conform with the fuselage surface in the closed position;

said closing wall being continuous in the open and closed positions and generally limited to the extent of said inlet opening;

said closing wall in said open position forming said ramp substantially directly inwardly transverse to the rearwardly direction;

said scoop being hinged to said aircraft adjacent the forward end of said inlet opening;

said scoop being externally of said aircraft in the closed position;

said scoop having a cross section complementary to said inlet to fit therein in the open position;

said scoop having a passage therethrough to permit inlet air to move therethrough from outside the fuselage into the inlet.

5. The invention according to claim 4 in which:

said scoop has a generally rectangular cross section; and a bottom surface thereof forming said closing wall.

6. The invention according to claim 5 in which:

said scoop has structural supports therein providing flow passage portions therealong.

7. A method of dissipating boundary layer and eliminating adverse pressure gradient adjacent an auxiliary power unit air inlet in an aircraft tail cone, comprising:

an inlet opening contoured along its outer edges to conform to the aircraft fuselage, a ramp trailing inwardly into the opening starting from the fuselage and forming the bottom surface of the inlet;

the inlet having generally parallel side walls trailing inwardly and rearwardly along opposite edges of the ramp;

the side walls extending inwardly from the fuselage edges along the inlet opening;

hingedly engaging a scoop to said aircraft adjacent said fuselage and adjacent one end of said inlet opening;

providing in the aircraft means to operate the scoop from positions in which said scoop opens and closes said inlet opening;

providing said scoop with a closing wall with respect to said inlet opening, said closing wall closing said opening in the closed position and being contoured to conform with the fuselage surface in the closed position;

said closing wall being continuous in the open and closed positions and generally limited to the extent of said inlet opening;

moving said closing wall to said open position to form a ramp substantially directly inwardly transverse to the rearwardly direction and inwardly transverse to the rearwardly direction and inwardly of the open position, hinging said scoop to said aircraft adjacent the forward end of said inlet opening; and moving said scoop to be externally of said aircraft in the closed position;

said scoop having a cross section complementary to said inlet to fit therein the open position;

said scoop having a passage therethrough to permit inlet air to move therethrough from outside the fuselage into the inlet.

8. The method according to claim 7 in which:
said scoop has a generally rectangular cross section; and
a bottom surface thereof forming said closing wall.

9. The method according to claim 8 including:
inserting structural supports in said scoop and providing flow passage portions therealong.

10. For use on an aircraft adjacent the tail cone, an air inlet and scoop for an in-flight auxiliary power unit, the scoop being adapted to open and start operation at altitude and on the ground, comprising:

an inlet opening contoured along its outer edges to conform to the aircraft fuselage, a fixed ramp trailing inwardly into the opening starting from a leading end of the opening and from the fuselage and forming the bottom surface of the inlet; the ramp trailing rearwardly beyond the opening;

the inlet opening having generally parallel side walls trailing inwardly along opposite edges of the ramp;

the side walls extending inwardly from the fuselage edges along the inlet opening;

a scoop hingedly engaged at a trailing end to said aircraft inwardly of said fuselage, the hinge being fixed inwardly of the rearward end of the inlet opening; a leading end of the scoop being free; and means in said aircraft to operate said scoop from positions in which said scoop opens and closes said inlet opening;

said scoop having a closing wall with respect to said inlet opening, said closing wall closing said opening in the closed position and being contoured to conform with the fuselage surface in the closed position;

said closing wall being continuous in the open and closed positions and generally limited to the extent of said inlet opening.

11. The invention according to claim 10 in which:
said closing wall is pivoted outwardly on its hinge to be spaced from said ramp to open said inlet opening;

continuous scoop side walls extending inwardly from edges of said closing wall to form an inwardly opening channel in cross section for the extent of the closing wall;

said scoop side walls being juxtaposed to respective inlet side walls in the closed position within the inlet opening;

said scoop side walls in the closed position terminating inwardly adjacent said hinge and having rearward inner edges spaced outwardly from said ramp, said inner edges extending forwardly to be closely adjacent said ramp and tapering along said ramp to a point at the forward end of said scoop and at the closing wall;

said tapering inner edges of scoop side walls being spaced outwardly from said fuselage surface when said scoop is open.

12. The invention according to claim 11 in which:
portions of said rearward inner edges are spaced outwardly from said fuselage surface when said scoop is open.

13. The invention according to claim 10 in which:
said closing wall is pivoted outwardly on its hinge to be spaced from said ramp to open said inlet opening;

continuous scoop side walls extending inwardly from edges of said closing wall to form an inwardly opening channel in cross section;

rearward portions of said scoop side walls being juxtaposed to respective inlet side walls in the closed position within the inlet opening;

said rearward portions of said scoop side walls in the closed position terminating inwardly adjacent said hinge and having inner edges spaced from said ramp;

said scoop side walls having forward portions extending from forward ends of said rearward portions;

said forward portions extending inwardly with respect to said rearward portions and said ramp and having inner edges tapering rearwardly from the forward end of the scoop to the forward ends of the rearward portions;

inwardly extending channel-shaped slots on both sides of the ramp to receive substantial parts of said forward portions in the closed position and to contain and laterally support said inner edges of the forward portions in the open position.

14. A method of dissipating boundary layer and eliminating adverse pressure gradient adjacent an auxiliary power unit air inlet in an aircraft tail cone, comprising:

an inlet opening contoured along its outer edges to conform to the aircraft fuselage, a ramp trailing inwardly into the opening starting from the fuselage and forming the bottom surface of the inlet;

the inlet having generally parallel side walls trailing inwardly and rearwardly along opposite edges of the ramp;

the side walls extending inwardly from the fuselage edges along the inlet opening;

hingedly engaging a scoop to said aircraft adjacent said fuselage and adjacent one end of said inlet opening;

providing in the aircraft means to operate the scoop from positions in which said scoop opens and closes said inlet opening; and providing said scoop with a closing wall with respect to said inlet opening, said closing wall closing said opening in the closed position and being contoured to conform with the fuselage surface in the closed position;

said closing wall being continuous in the open and closed positions and generally limited to the extent of said inlet opening;

moving said closing wall to said open position to form a ramp substantially directly inwardly transverse to the rearwardly direction and inwardly of the open position; and moving said scoop to be externally of said aircraft in the closed position;

said scoop having a passage therethrough to permit inlet air to move therethrough from outside the fuselage into the inlet.

15. A method of dissipating boundary layer and eliminating adverse pressure gradient adjacent an auxiliary power unit air inlet in an aircraft tail cone, comprising:

an inlet opening contoured along its outer edges to conform to the aircraft fuselage, a fixed ramp trailing inwardly into the opening starting from the fuselage and forming the bottom surface of the inlet;

the inlet having generally parallel side walls trailing inwardly and rearwardly along opposite edges of the ramp;

the side walls extending inwardly from the fuselage edges along the inlet opening;

hingedly engaging a scoop at a trailing end to said aircraft adjacent said fuselage and adjacent the rearward end of said inlet opening; a leading end of the scoop being free;

providing in the aircraft means to operate the scoop from positions in which said scoop opens and closes said inlet opening; and providing said scoop with a closing wall with respect to said inlet opening, said closing wall closing said opening in the closed position and being contoured to conform with the fuselage surface in the closed position;

said closing wall being continuous in the open and closed positions and generally limited to the extent of said inlet opening;

pivoting said closing wall outwardly on its hinge to be spaced from said ramp to open said inlet opening;

continuous scoop side walls extending inwardly from edges of said closing wall to form an inwardly opening channel in cross section;

rearward portions of said scoop side walls being juxtaposed to respective inlet side walls in the closed position within the inlet opening;

said rearward portions of said scoop side walls in the closed position terminating inwardly adjacent said hinge and having inner edges spaced from said ramp;

said scoop side walls having forward portions extending from forward ends of said rearward portions;

said forward portions extending inwardly with respect to said rearward portions and said ramp and having inner edges tapering rearwardly from the forward end of the scoop to the forward end of the rearward portions;

inwardly extending channel-shaped slots on both sides of the ramp to receive said forward portions in the closed position; and the forward portions extending partially into said slots in the open position at the forward ends to support the scoop laterally.

* * * * *